(12) United States Patent
Takahashi et al.

(10) Patent No.: US 6,495,776 B1
(45) Date of Patent: Dec. 17, 2002

(54) STALK LEVER FIXED WITH HOLDER MEMBER FOR OPERATING TURN SIGNAL SWITCH OR KNOB SWITCH AND THE LIKE

(75) Inventors: Atsuo Takahashi, Miyagi-ken (JP); Yasuo Takii, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/519,118

(22) Filed: Mar. 6, 2000

(30) Foreign Application Priority Data

Mar. 12, 1999 (JP) .......................................... 11-066323

(51) Int. Cl.[7] ................................................ H01H 9/00
(52) U.S. Cl. .................................. 200/61.54; 200/61.27
(58) Field of Search ................ 200/61.54, 61.27–61.38; 340/425.5–475

(56) References Cited

U.S. PATENT DOCUMENTS 5,294,759 A    3/1994   Krehnovi
5,742,014 A   *   4/1998   Schwartz et al. ........ 200/61.27

* cited by examiner

Primary Examiner—Elvin Enad
Assistant Examiner—Lisa N Klaus
(74) Attorney, Agent, or Firm—Brinks Hofer Gilson & Lione

(57) ABSTRACT

There is provided a stalk lever in which its assembling can be easily carried out and a degree of freedom in its design can be improved. The present invention is constructed such that when the longitudinal hole formed at the connecting section of the lever main body R is closed by the lid, the engaging sections formed to be protruded at the lid are fitted to the fitting sections formed to be indented at the holders and then the holder members are fixed to the holder engaging sections.

12 Claims, 3 Drawing Sheets

STALK LEVER FIXED WITH HOLDER MEMBER FOR OPERATING TURN SIGNAL SWITCH OR KNOB SWITCH AND THE LIKE

BACKGROUND OF THE INVENTION

1. Field of the Invention

This invention relates to a stalk lever fixed to a steering column of an automobile in such a way that it can be swung, and more particularly a stalk lever to which a holder member for use in operating either a turn signal switch or a knob switch and the like is fixed.

2. Description of the Prior Art

In general, a stalk lever having a turn signal switch or a knob switch or the like for use in controlling an operation of a wiper or head lamps or turn signals and the like fixed through a holder member is attached to a steering column of a vehicle rotatbly.

Such a prior art stalk lever described above is constructed such that a first holder member for use in operating a turn signal switch is fixed to one end of the lever main body, the lever main body is rotated from its neutral position to either a right or left direction indicating position, whereby the turn signal switch is turned ON/OFF to cause an illumination control of lamps for turning-left or turning-right operation.

In addition, a second holder member for fixing a knob switch or the like is fixed to the other end of the lever main body. The knob switch performs either a rotating control of the wiper or an illumination control for the head lamps while being rotated, for example.

The prior art stalk lever is constructed such that a connecting section for connecting both ends of the lever main body is formed and the connecting section is of a hollow pipe-shape. A lead wire connected to the knob switch at the other end is drawn around in the cavity of the connecting section and extended out to the steering column.

Locations near both ends of the lever main body are provided with a through hole passing in an upward or downward direction and the first and second holder members are also formed with through holes, respectively.

In order to fix the first and second holder members to the lever main body, a round pin is press fitted into the through holes with a pressing jig under a state in which a position of the through hole in the lever main body and positions of the through holes in the holder members are aligned to each other, the first holder member is fixed to one end of the lever main body and the second holder member is fixed to the other end to constitute the stalk lever.

However, in the prior art stalk lever described above, the fixing work for fixing the first holder member and the second holder member to the lever main body was carried out by press fitting a round pin with a press fitting jig, so that a large number of assembling facilities such as a press fitting jig were required and at the same time, an assembling time for the press fitting operation was required.

Further, when the stalk lever was assembled, the lead wire extending out of the knob switch fixed to the second holder member of the lever main body was inserted into the cavity at the connecting part and had to be drawn around up to one end of the stalk lever, resulting in that it was difficult to draw around the lead wire and took much time for the assembling work of the stalk lever.

In addition, there was a problem that an outer appearance of the stalk lever was deteriorated due to the fact that the through holes for use in press fitting the pins at both ends of the lever main body to fix the first and second holder members were seen from outside.

It is an object of the present invention to solve the aforesaid problem and to provide a stalk lever in which its assembling can be easily carried out and a degree of freedom in design can be improved.

SUMMARY OF THE INVENTION

The stalk lever of the present invention applied as the first means for overcoming the aforesaid problem is constructed such that it is comprised of holder engaging sections formed at both ends of a lever main body, a connecting section for connecting the holder engaging sections at both ends, a longitudinal hole formed at this connecting section, holder members which can be fixed to at least one of the holder engaging sections at the both ends and a lid for closing the longitudinal hole of the connecting section, wherein the lid is provided with engaging sections for fixing the holder members to the holder engaging sections, the holder members are formed with fitting sections which can be fitted to the engaging sections, the engaging sections of the lid are fitted to the fitting sections of the holder members when the longitudinal hole is closed by the lid and the holder members are fixed to the holder engaging sections.

In addition, as the second means for overcoming the aforesaid problem, in the first means, it is constructed such that the engaging sections of the lid are formed into protrusions, the fitting sections of the holder members are formed into indentations where the engaging sections can be fitted, and the engaging sections of the lid are fitted to the fitting sections of the holder members.

Further, as the third means for overcoming the aforesaid problem, in the first and second means, it is constructed such that the engaging sections of the lid are formed in such a way that they may be resiliently deformed, the engaging sections and the fitting sections can be snap fitted to each other, the engaging sections are snap fitted to the fitting sections, the lid is fixed to the connecting section and the holder members are prevented from being pulled off at the holder engaging sections.

Additionally, as the fourth means for overcoming the aforesaid problem, in the first, second and third means, it is constructed such that the holder members are comprised of a first holder member fixed to the holder engaging section at one end of the lever main body and a second holder member fixed to the holder engaging section at the other end of the lever main body, the lever main body is attached to a supporting member through the first holder member and can be turned, a switch comprised of a turn signal switch or the like can be operated through the first holder member by a turning operation of the lever main body, and either a knob switch which can be rotated or a push switch which can be pushed can be fixed to the second holder member.

PREFERRED EMBODIMENTS OF THE INVENTION

Figure 1:
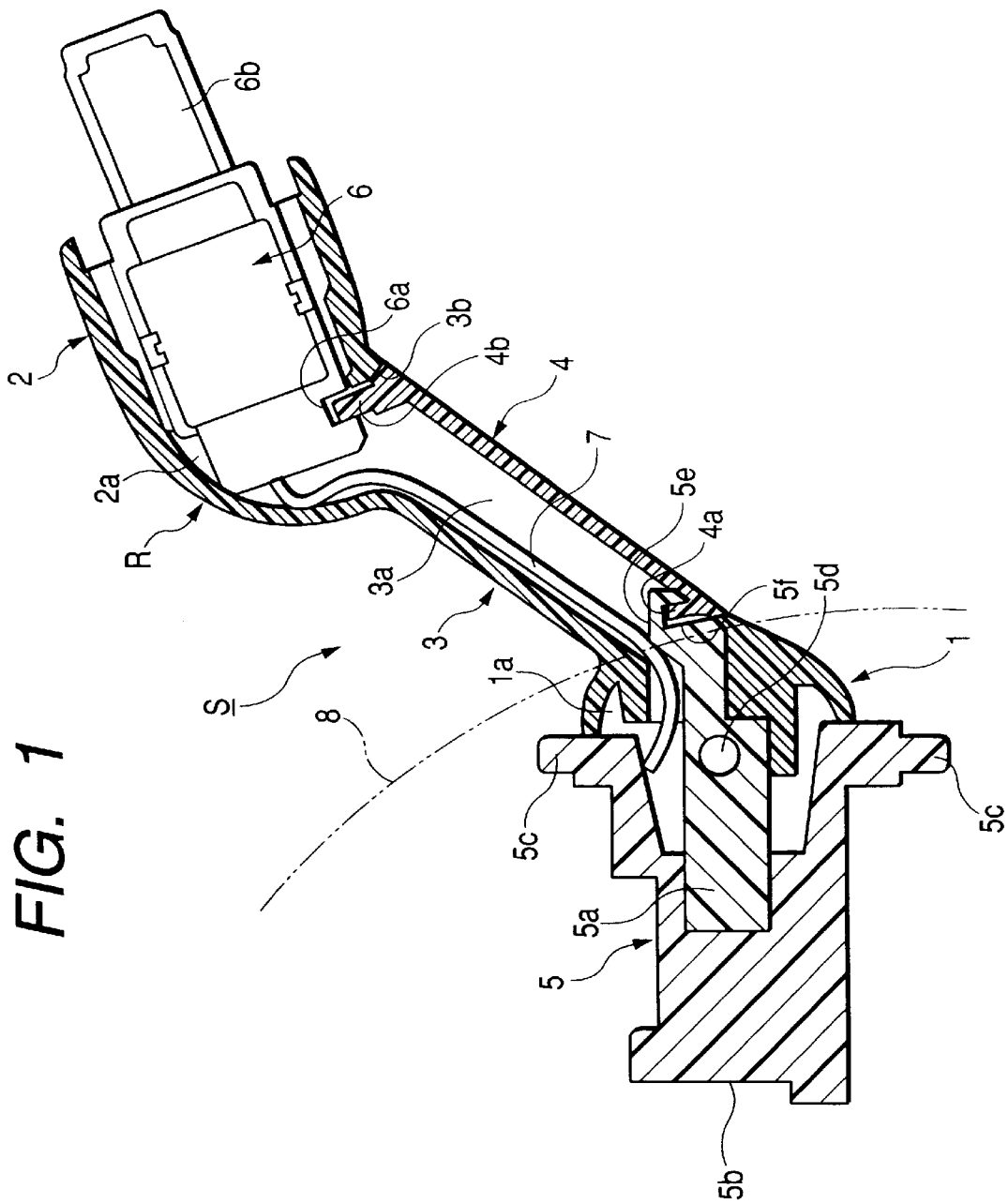
FIG. 1 is a sectional view for showing a substantial part of a stalk 1 ever of the present invention.
Figure 2:
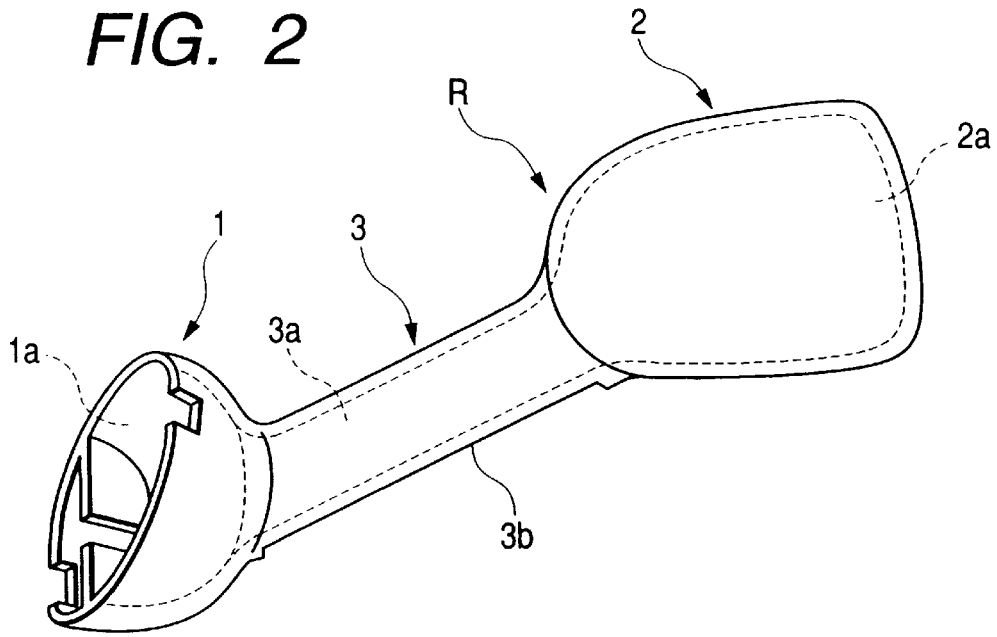
FIG. 2 is a perspective view for showing a lever main body of the present invention.
Figure 3:
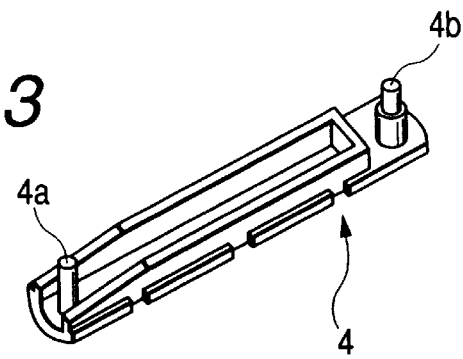
FIG. 3 is a perspective view for showing a lid member of the present invention.
Figure 4:
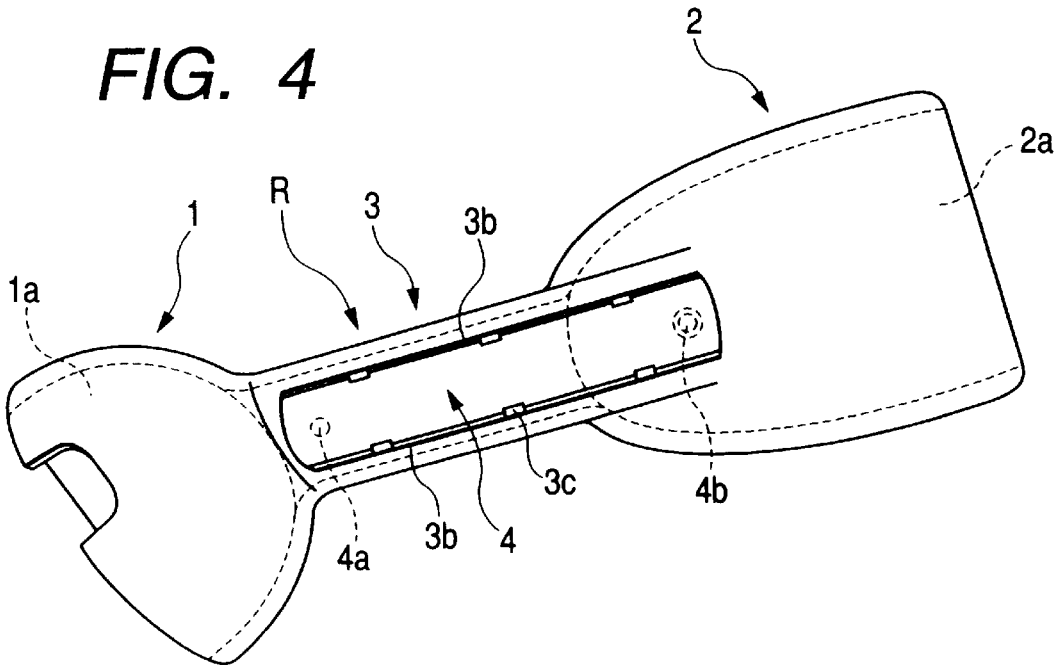
FIG. 4 is a bottom view for showing a lever main body of the present invention.
Figure 5:
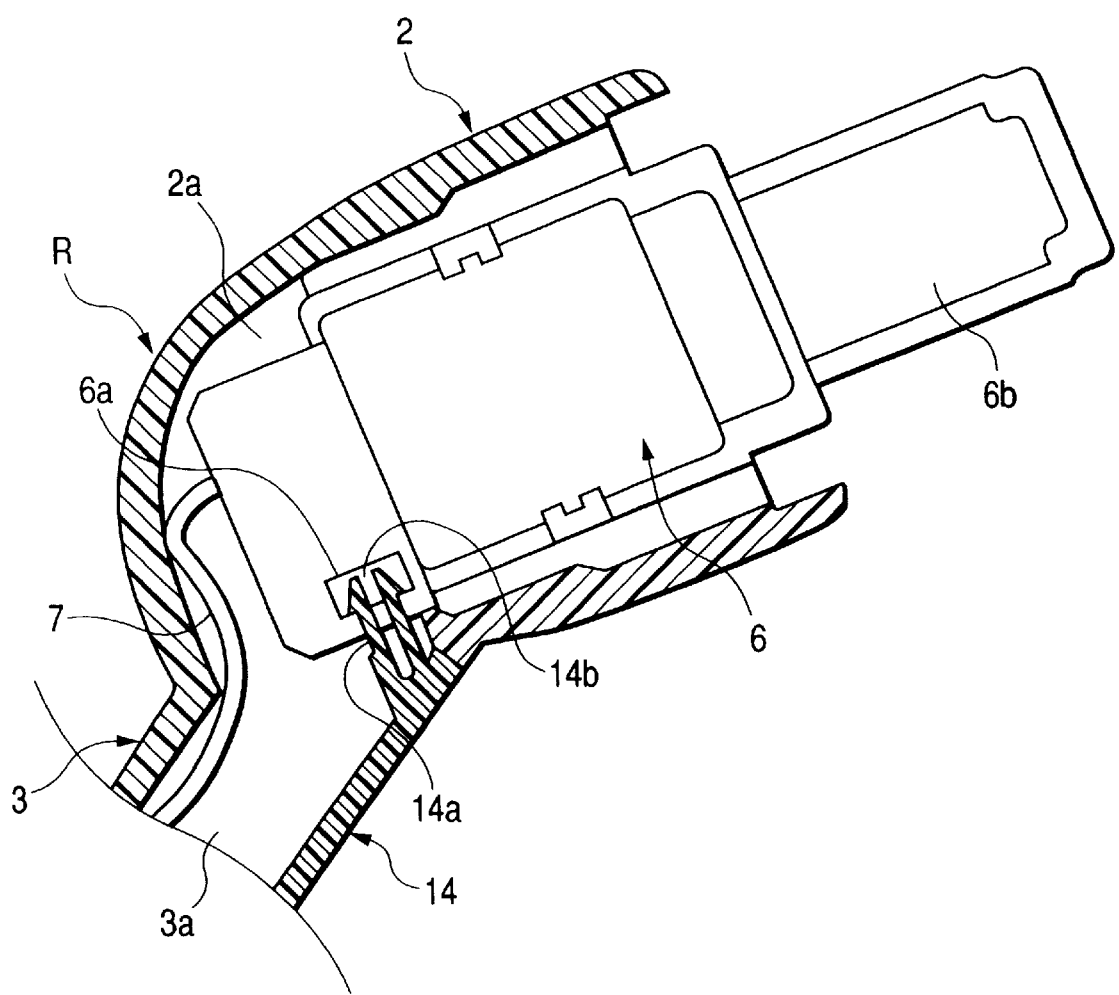
FIG. 5 is an enlarged view for showing a substantial part to illustrate another preferred embodiment of the present invention.

Referring now to the drawings, one preferred embodiment of the stalk lever of the present invention will be described as follows. FIG. 1 is a sectional view for showing a substantial part of the stalk lever of the present invention, FIG. 2 is a perspective view for showing a lever main body of the present invention, FIG. 3 is a perspective view for showing a lid member of the present invention, FIG. 4 is a bottom view for showing a lever main body of the present invention and FIG. 5 is an enlarged view for showing a substantial part to illustrate another preferred embodiment of the present invention.

Referring to FIGS. 1 to 4, the stalk lever of the present invention will be described as follows. At first, the stalk lever S of the present invention is constructed such that a lever main body R comprised of a molded product made of resin material and the like is disposed, the lever main body R has the first and second holder engaging sections 1, 2 at both ends thereof.

The first holder engaging section 1 is made such that its outer shape is formed at one end of the lever main body R, the second holder engaging section is made such that its outer shape is formed into a bullet shape at the other end of the lever main body R, and each of the first and second holder engaging sections 1, 2 is formed with cavities 1a, 2a within it, respectively.

The lever main body R is formed under such a state as one in which a pipe-like connecting section 3 having a hollow cavity 3a for use in connecting the first and second holder engaging sections 1, 2 at both ends is inclined in a slant state as shown in FIG. 1.

Then, each of the cavities 1a, 2a in the first and second holder engaging sections 1, 2 is communicated with each other through a cavity 3a of the connecting section 3.

A substantial rectangular longitudinal hole 3b having, a longitudinal length extending toward the first and second holder engaging sections 1, 2 as shown in FIG. 4 is formed at the lower surface of the connecting section 3 to cause the inside part of the cavity 3a to be released and then a plurality of hook sections 3c are formed at a longitudinal side surface of the longitudinal hole 3b.

The longitudinal hole 3b can be closed by a lid 4 which is snap fitted to the hook section 3c. The lid 4 is made of resin material and as shown in FIGS. 3 and 4, its outer shape is formed into a substantial rectangular shape of the same shape as that of the longitudinal hole 3b and the locations near both ends of the lid 4 are provided with engaging sections 4a, 4b formed into such protrusions as those enabling the first and second holder members 5, 6 described later to be fixed as shown in FIG. 3.

A first holder member 5 is fixed to the first holder engaging section 1 and the first holder member 5 is made such that a holding member 5a and an actuator 5b are integrally formed into an assembly.

As shown in FIG. 1, each of a pivoting support shaft 5c projecting in an upward or downward direction and a pivoting support shaft 5d projecting in a vertical direction perpendicular to a sheet of drawing is formed to be projected in four directions at the first holder member 5.

In addition, the holding member 5a has a holding section 5e formed to be projected toward the inner side of the cavity 1a, a location near the extremity end of the holding section 5e has a fitting section 5f formed in an indentation shape, an engaging section 4a of the lid 4 is engaged with the fitting section 5f and then the first holder member 5 can be fixed to the first holder engaging section 1.

Then, the pivoting support shafts 5c, 5d of the first holder member 5 are fixed to the supporting member for the turn signal switch not shown, for example, under a state in which the first holder member 5 is fixed to the first holder engaging section 1, thereby the first holder member 5 can be turned.

That is, the lever main body R is attached to the supporting member (not shown) at the steering column through the first holder member 5 and can be turned.

Then, as the lever main body R is turned in either a direction of X-axis or a direction of Y-axis, the first holder member 5 is turned around fulcrum points of the pivoting support shafts 5c, 5d, the actuator 5b may operate a turn signal switch (not shown), for example, and control an illumination of the direction indicating lamps.

In addition, a second holder member 6 can be fixed in the cavity 2a of the second holder engaging section 2. This second holder member 6 is made such that one end inserted into the cavity 2a is formed with a concave fitting section 6a and at the same time the other end projected outward from the cavity 2a is formed with a knob fixing section 6b. To the fitting section 6a can be fitted a projecting engaging section 4b of the lid 4.

To the knob fixing section 6b can be fixed a rotatable knob switch (not shown), or a push switch which can be pushed. When the knob switch is rotated to turn ON/OFF, a turning operation of a wiper, or a turning speed of a wiper and the like, for example, can be controlled.

In addition, the push switch is pressed, washing liquid, for example, can be injected against a windshield glass.

Further, a lead wire 7 connected to the knob switch (not shown) and extended out is pulled around the cavity 3a of the connecting section 3 from the second holder member 6 and then drawn out to the cavity 1a of the first holder engaging section 1.

The the longitudinal hole 3b is closed by lid member 4 after the lead wire 7 is pulled around the cavity 1a of the first holder engaging section 1 from the cavity 2a of the second holder engaging section 2.

The stalk lever S of the present invention having such a configuration as above is constructed such that the side of the lever main body R at the first holder engaging section 1 is fixed to a supporting member (not shown) of the steering column 8 indicated by a dotted line as illustrated in FIG. 1, and the lever can be turned around fulcrum points of the turning support shafts 5c, 5d in four directions of X-direction and Y-direction, respectively.

Assembling of the stalk lever S of the present invention is carried out such that when the holding section 5e of the first holder member 5 is inserted into the cavity 1a of the first holder engaging section 1 of the lever main body R, a position of the first holder member 5 is set by a position setting section (not shown) in the cavity 1a.

In addition, when the side where the fitting section 6a of the second holder member 6 is formed is inserted into the cavity 2a of the second holder engaging section 2, the position of the second holder 6 is set by the position setting section (not shown) in the cavity 2a.

Next, the lead wire 7 extending from the cavity 2a of the second holder engaging section 2 to the cavity 3a of the connecting section 3 is once drawn out of the longitudinal hole 3b, and after this operation, it is manually inserted into the cavity 1a of the first holder engaging section 1, it is passed through the cavity 3a of the connecting section 3 from the cavity 2a of the second holder engaging section 2 and is pulled around to the side of the cavity 1a of the first holder engaging section 1.

After the lead wire 7 is drawn around the first holder engaging section 1, the lid 4 is pushed into the longitudinal hole 3b of the connecting section 3, thereby one engaging section 4a of the lid 4 is fitted to the fitting section 5f of the first holder member 5, the other engaging section 4b is fitted to the fitting section 6a of the second holder member 6, the lid 4 is snap fitted to the hook sections 3c of the longitudinal hole 3b, and the first and second.holder members 5, 6 are fixed to the first and second holder engaging sections while being prevented from being loosened.

Such an assembled stalk lever S as described above is made such that a turn signal switch (not shown), for example, is fixed to the actuator 5b of the first holder member 5, and a rotary type knob switch (not shown) is fixed to the knob fixing section 6b of the second holder member 6 of the second holder engaging section 2. After this operation, a housing for a turn signal switch (not shown) is fixed to the steering column indicated by a dotted line to enable the lever main body R to be rotated around the fulcrum points of rotating support shafts 5c, 5d.

As another preferred embodiment of the present invention, the engaging section 14a of the lid 14 is provided with a slit groove 14b, as shown in FIG. 5, the extremity end of the engaging section 14a can be resiliently deformed by this slit groove 14b and the shape of the extremity end of the engaging section 14a is formed as a wedge shape.

In addition, the fitting section 6a of the holder member, that is, the second holder member 6, for example, is formed into such an indentation shape as one in which the wedge-shaped engaging section 14a can be snap fitted.

That is, the engaging section 14a of the lid 14 is formed in such a way that it may be resiliently deformed, the engaging section 14a and the fitting section 6a can be snap fitted to each other, the engaging section 14a is snap fitted to the fitting section 6a, the lid 4 is fixed to the connecting section 3 and at the same time the holder member 6 is fixed to the holder engaging section 2a so as not to be loosened.

In addition, the preferred embodiment of the present invention has been described in reference to the case in which it may be made such that the first holder member 5 is fixed to the first holder engaging section 1 and the second holder member 6 is fixed to the second holder engaging section 2, respectively. It is also available that any one of the holder members is fixed to any one of the holder engaging sections.

Further, it is also preferable that a plurality of holder members are fixed to the holder fixing section at any one of the ends, the plurality of holder members are provided with the fitting sections so as to be fitted to the fitting section of the lid and at the same time the switches and the like are attached to them in such a way that they may be operated.

The stalk lever of the present invention acting as the first means is constructed such that the lid for closing the longitudinal hole formed at the connecting section of the lever main body is provided with the engaging section for use in fixing the holder members to the holder engaging sections, the holder members are formed with fitting sections which can be fitted to the engaging sections of the lid, the engaging sections formed at the lid are fitted to the engaging sections of the holder member so as to cause the holder member to be fixed to the holder engaging section, resulting in that the fixing of the holder members to the lever main body can be carried out by a manual operation in which the lid is fixed to the longitudinal hole, so that a jig for use in press fitting the prior art round pin into the hole can be eliminated.

In addition, since the hole for use in press fitting the prior art round pin or the like into the lever main body can be eliminated, a degree of freedom in design of the lever can be improved.

Additionally, in the case that the lead wire is drawn around in the cavity of the lever main body, this can be performed through the longitudinal hole formed at the connecting section and the lead wire can be easily drawn around at the cavity of the holder engaging section.

Further, as the second means of the present invention, since the engaging sections of the lid in the first means are formed to be protruded and the fitting sections of the holder member are formed into an indentation shape in which the fitting sections can be fitted and the engaging sections of the lid are fitted to the fitting sections of the holder, so that fixing of the lid to the longitudinal hole enables the holder member to be fixed concurrently and then a stalk lever showing a superior assembling characteristic can be provided.

In addition, as the third means of the present invention, the engaging sections of the lid in the first and second means are formed in such a way that they can be resiliently deformed, the engaging sections and the fitting sections can be snap fitted to each other, the engaging sections are snap fitted to the fitting sections to cause the lid to be fixed to the connecting section and at the same time the holder member is hooked to the holder engaging section not to be loosened so that the holder member can be rigidly hooked to the holder engaging sections and the lid can be easily fixed to the longitudinal hole.

In addition, as the fourth means of the present invention, the holder member in the first, second and third means is comprised of a first holder member fixed to the holder engaging section at one end of the lever main body and a second holder member fixed to the holder engaging section of the other end of the lever main body, the lever main body is attached to the supporting member through the first holder member and can be turned, thereby a switch comprised of a turn signal switch and the like can be operated through the first holder member and either a knob switch which can be rotationally operated or a push switch which can be pushed can be fixed to the second holder member, so that the first and second holder members can be fixed to the lever main body in a rigid and positive manner and the turn signal switch or the knob switch or the push switch can be operated in a precise manner.

What is claimed is:

1. A stalk lever comprising: holder engaging sections formed at both ends of a lever main body; a connecting section, having a hollow cavity, for connecting the holder engaging sections at both ends; a wire extending between the both ends through the hollow cavity, a longitudinal hole extending toward the holder engaging sections formed at the connecting section; holder members mountable to the holder engaging sections at the both ends; respectively, and a lid for closing the longitudinal hole of the connecting section, wherein the lid is provided with engaging sections for fixing the holder members to the holder engaging sections, the holder members are formed with fitting sections which can be fitted to the engaging sections, the engaging sections of the lid are fitted to the fitting sections of the holder members when the longitudinal hole is closed by the lid and the holder members are fixed to the holder engaging sections.

2. A stalk lever according to claim 1,
wherein the engaging sections of the lid are formed into protrusions, the fitting sections of the holder members are formed into indentations where the engaging sections can be fitted, and the engaging sections of the lid are fitted to the fitting sections of the holder members.

3. A stalk lever according to claim 2,
wherein the engaging sections of the lid are formed in such a way that they may be resiliently deformed, the engaging sections and the fitting sections can be snap fitted to each other, the engaging sections are snap fitted to the fitting sections, the lid is fixed to the connecting section and the holder members are prevented from being pulled off at the holder engaging sections.

4. A stalk lever according to claim 3,
wherein the holder member is comprised of a first holder member fixed to the holder engaging section at one end of the lever main body and a second holder member fixed to the holder engaging section at the other end of the lever main body, the lever main body is attached to a supporting member through the first holder member and can be turned, a switch comprised of a turn signal switch can be operated through the first holder member by a turning operation of the lever main body and either a knob switch which can be rotated or a push switch which can be pushed can be fixed to the second holder member.

5. A stalk lever according to claim 2,
wherein the holder member is comprised of a first holder member fixed to the holder engaging section at one end of the lever main body and a second holder member fixed to the holder engaging section at the other end of the lever main body, the lever main body is attached to a supporting member through the first holder member and can be turned, a switch comprised of a turn signal switch can be operated through the first holder member by a turning operation of the lever main body and either a knob switch which can be rotated or a push switch which can be pushed can be fixed to the second holder member.

6. A stalk lever according to claim 1,
wherein engaging sections of the lid are formed in such a way that they may be resiliently deformed, the engaging sections and the fitting sections can be snap fitted to each other, the engaging sections are snap fitted to the fitting sections, the lid is fixed to the connecting section and the holder members are prevented from being pulled off at holder engaging sections.

7. A stalk lever according to claim 6,
wherein the holder member is comprised of a first holder member fixed to the holder engaging section at one end of the lever main body and a second holder member fixed to the holder engaging section at the other end of the lever main body, the lever main body is attached to a supporting member through the first holder member and can be turned, a switch comprised of a turn signal switch can be operated through the first holder member by a turning operation of the lever main body and either a knob switch which can be rotated or a push switch which can be pushed can be fixed to the second holder member.

8. A stalk lever according to claim 1,
wherein a holder member is comprised of a first holder member fixed to the holder engaging section at one end of the lever main body and a second holder member fixed to the holder engaging section at the other end of the lever main body, the lever main body is attached to a supporting member through the first holder member and can be turned, a switch comprised of a turn signal switch can be operated through the first holder member by a turning operation of the lever main body and either a knob switch which can be rotated or a push switch which can be pushed can be fixed to the second holder member.

9. A stalk lever comprising:

a lever main body;

a holder engaging section coupled to an end of the lever main body;

a connecting section coupled to the holder engaging section, the connecting section having a hollow cavity;

a wire extending through the hollow cavity and a portion of the holder engaging section;

a longitudinal hole formed within the connecting section;

a holder member coupled to the holder engaging section; and a releasable lid covering the longitudinal hole, the releasable lid comprising a lid engaging section coupling the holder member within the holder engaging section, the holder member comprising a fitting section coupled to the lid engaging section.

10. A stalk lever according to claim 9, wherein the lid engaging section comprises a protrusion and the fitting section comprises an indentation configured to receive the lid engaging section.

11. A stalk lever according to claim 9, wherein the lid engaging section comprises a resiliently deformable material that is snap fitted to the fitting section which couples the holder member within the holder engaging section.

12. A stalk lever according to claim 9, wherein the holder member is coupled to at least one of a rotatably operable switch and a push operable switch.

* * * * *